United States Patent
McCune, Jr.

(10) Patent No.: US 10,129,946 B2
(45) Date of Patent: Nov. 13, 2018

(54) HIGH-EFFICIENCY, WIDE DYNAMIC RANGE DIMMING FOR SOLID-STATE LIGHTING

(71) Applicant: Earl W. McCune, Jr., Santa Clara, CA (US)

(72) Inventor: Earl W. McCune, Jr., Santa Clara, CA (US)

( * ) Notice: Subject to any disclaimer, the term of this patent is extended or adjusted under 35 U.S.C. 154(b) by 0 days.

(21) Appl. No.: 15/239,296

(22) Filed: Aug. 17, 2016

(65) Prior Publication Data

US 2016/0360590 A1 Dec. 8, 2016

Related U.S. Application Data

(63) Continuation of application No. 14/620,712, filed on Feb. 12, 2015, now Pat. No. 9,456,481.

(51) Int. Cl.
*H05B 33/08* (2006.01)

(52) U.S. Cl.
CPC ..... *H05B 33/0851* (2013.01); *H05B 33/0812* (2013.01); *Y02B 20/345* (2013.01)

(58) Field of Classification Search
None
See application file for complete search history.

(56) References Cited

U.S. PATENT DOCUMENTS

| | | | |
|---|---|---|---|
| 7,202,608 B2* | 4/2007 | Robinson | H05B 33/0815 315/224 |
| 7,642,762 B2* | 1/2010 | Xie | H02M 3/156 315/224 |
| 8,907,593 B2* | 12/2014 | Zhang | G02F 1/133603 315/291 |
| 8,941,313 B2* | 1/2015 | He | H05B 33/0818 315/209 R |
| 9,030,122 B2* | 5/2015 | Yan | H05B 33/0818 315/291 |
| 9,456,481 B2* | 9/2016 | McCune, Jr. | H05B 33/0851 |
| 2011/0012582 A1* | 1/2011 | Aisu | G05F 1/575 323/314 |
| 2011/0204777 A1* | 8/2011 | Lenk | F21K 9/00 315/32 |

* cited by examiner

*Primary Examiner* — Jimmy Vu
*Assistant Examiner* — Laura Yesildag
(74) *Attorney, Agent, or Firm* — Patent Law Professionals, P.C.; William E. Winters

(57) ABSTRACT

A solid-state lighting system includes a light-emitting device connected in series with a variable dim setting resistor, an adjustable regulator, and a current sensor disposed in a feedback loop between an adjust input of the adjustable regulator and the variable dim setting resistor. The voltage dropped across the variable dim setting resistor is forced to remain constant irrespective of the resistance setting of the dim setting resistor. The current sensor measures or senses the current flowing through the variable dim setting resistor and causes the adjustable regulator to adjust its output voltage and the forward voltage drop across the light-emitting device so that the current flowing through the light-emitting device matches the current set by the variable dim setting resistor. Controlling the current in this manner allows dimming to be performed over an extremely wide dimming range, to very low light levels, and without producing light flicker at any dim level.

7 Claims, 7 Drawing Sheets

HIGH-EFFICIENCY, WIDE DYNAMIC RANGE DIMMING FOR SOLID-STATE LIGHTING

CROSS-REFERENCE TO RELATED APPLICATIONS

This application is a continuation of U.S. patent application Ser. No. 14/620,712, filed on Feb. 12, 2015, which claims the benefit of U.S. Provisional Patent Application No. 61/944,149, filed on Feb. 25, 2014.

FIELD OF THE INVENTION

The present invention relates in general to solid-state lighting (SSL) systems and in particular to methods and apparatus for performing dimming in SSL systems over an extremely wide dimming range and to very low dimming levels.

BACKGROUND OF THE INVENTION

Solid-state lighting (SSL) is rapidly becoming commonplace in many areas of modern society. SSL employs light-emitting diodes (LEDs), which are inexpensive, durable, small in size, energy-efficient, and long-lasting. This desirable combination of attributes is not present in more conventional lighting sources, such as incandescent and fluorescent lighting sources.

In some circumstances it is necessary or desirable to control dimming of the light produced by a lighting system. In an SSL system, dimming is typically performed using a technique known as pulse width modulation (PWM). FIG. 1 is a drawing showing the salient components of a PWM-based dimming system 100 typically used to perform dimming in an SSL system. The PWM-based dimming system 100 comprises an LED driver 102, an LED 104 (or string of LEDs connected in series), a transistor 106, and a current-limiting resistor 108. The LED driver 102 generates a PWM control signal which is used to drive the gate of the transistor 106. The PWM control signal comprises a sequence of pulses which determine whether the transistor 106 is turned ON or OFF. Since the transistor 106 is in series with the LED 104, turning the transistor 106 ON and OFF intermittently interrupts the current flowing through the LED 104 and, consequently, intermittently interrupts the light that the LED 104 emits. The durations (i.e., "widths") of the pulses in the PWM control signal are controlled (i.e., "modulated") by the LED driver 102, according to the setting of a dim control signal DIM applied to a dim control input of the LED driver 102. As the dim control signal DIM is lowered to effect dimming, the LED driver 102 responds by reducing the widths of the pulses in the PWM control signal. The reductions in the widths of the pulses results in a lower percentage of time during which the LED 104 conducts and emits light. On average, this result is perceived by the human eye as dimming.

In some lighting applications the light produced by a lighting system must be dimmable over a wide dynamic range and to very low light levels. In a movie theater, concert hall, or opera house, for example, it is often desirable to have a dimming dynamic range of 1000:1 or greater. When a PWM-based dimming system is employed to control the dimming, the duty cycle of the PWM control signal must therefore drop to as low as 0.1%, in order to realize the 1000:1 dimming dynamic range. Additionally, the frequency of the PWM control signal must be designed and set high enough to avoid undesirable light flicker. Unfortunately, due to the significant capacitance that is normally present at the input of most commercially available transistors 106, the PWM-based dimming approach is unable to respond properly to a PWM control signal having a duty cycle as low as 0.1% and a frequency that is high enough to avoid flicker, particularly at low light levels. This problem makes PWM-based dimming an unsatisfactory solution to achieving dimming over a wide dynamic range and to very low light levels.

It would be desirable, therefore, to have an SSL dimming system that is capable of realizing dimming over a wide dynamic range and to very low light levels, that is energy efficient, and that does not produce light flicker, especially at low light levels.

BRIEF SUMMARY OF THE INVENTION

Systems and methods for controlling dimming in solid-state lighting (SSL) systems are disclosed. An exemplary SSL lighting system for controlling dimming includes a variable dim setting resistor, one or more light-emitting devices, an adjustable regulator, and a sensor for measuring or sensing a current flowing through the variable dim setting resistor. The variable dim setting resistor is coupled in series with the one or more light-emitting devices and is configured to receive a dim control signal which sets and controls the resistance of the variable dim setting resistor. The adjustable regulator is configured to generate an adjustable and regulated power supply for powering the dim setting resistor and the one or more light-emitting devices. The sensor is disposed in a feedback loop between the variable dim setting resistor and an adjust input of the adjustable regulator and in one embodiment of the invention comprises an operational amplifier (op-amp) circuit which operates to maintain a constant voltage across the dim setting resistor, independent of the value of the dim control signal and resistance of the variable dim setting resistor. Upon the sensor measuring or sensing that the current flowing through the dim setting resistor has decreased (the decrease indicating that the variable dim setting resistor has been adjusted higher), the op-amp circuit generates an adjust signal for the adjustable regulator, causing the adjustable regulator to reduce the voltage it generates and supplies. The lower supply voltage causes the voltage drop across the one or more light-emitting devices to also decrease, resulting in a dimming of the light emitted by the one or more light-emitting devices. Test measurements have shown that the SSL systems of the present invention are capable of dimming over an extremely wide dimming range. For example, measurements have shown that not only are the SSL systems capable of a dimming ratio of greater than 1000:1, they have also shown that a dimming ratio exceeding 20,000:1 can be achieved.

Further features and advantages of the invention, including descriptions of the structure and operation of the above-summarized and other exemplary embodiments of the invention, will now be described in detail with respect to accompanying drawings, in which like reference numbers are used to indicate identical or functionally similar elements.

DETAILED DESCRIPTION

Figure 1:
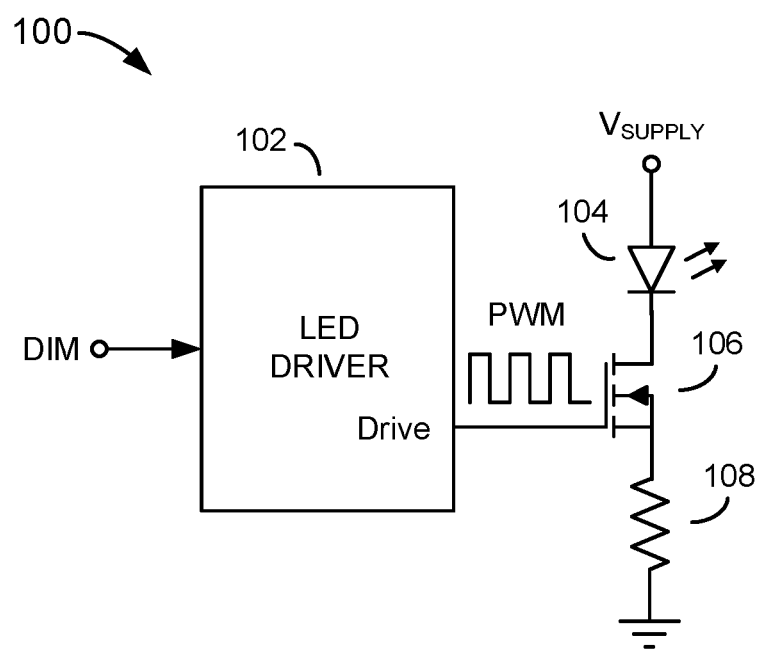
FIG. 1 is a schematic drawing of a prior art solid-state lighting (SSL) system that performs dimming using pulse-width modulation.
Figure 2:
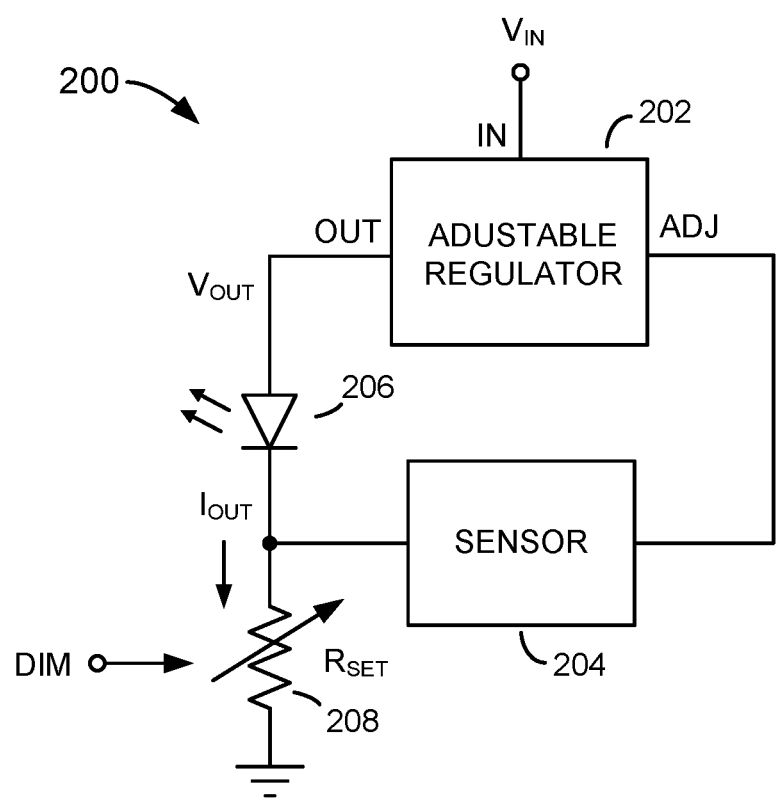
FIG. 2 is a schematic drawing of an SSL system configured to perform dimming, in accordance with an embodiment of the invention.

Referring to FIG. 2, there is shown a solid-state lighting (SSL) system 200 having extremely wide-range dimming capability, according to an embodiment of the present invention. The SSL system 200 comprises an adjustable regulator 202, a current sensor 204, a light-emitting device 206, and a variable dim setting resistor $R_{SET}$ 208. In the description that follows the SSL system 200 is described as controlling dimming of a single light-emitting diode (LED) 206. However, those of ordinary skill in the art will appreciate and understand that the SSL system 200 can be used to control dimming of a plurality of LEDs (e.g., a string of light-emitting devices). Further, the invention is not limited to controlling dimming of LEDs. It can be used or adapted to control dimming of other types of light-emitting devices, such as laser diodes, for example.

As shown in FIG. 2, the adjustable regulator 202 has an input power terminal (IN) that is configured to receive an input voltage $V_{in}$ from an external power supply (not shown), an output terminal (OUT) that provides a regulated and adjustable output voltage $V_{OUT}$, and an adjust terminal (ADJ) which is configured to receive an adjust signal from the output of the current sensor 204. The regulated output voltage $V_{OUT}$ serves as a supply voltage for the LED 206, which, as shown, is connected between the output terminal of the adjustable regulator 202 and a first end of the dim setting resistor $R_{SET}$ 208. A second end of the dim setting resistor $R_{SET}$ 208 is connected to ground. The current sensor 204 is configured in a feedback loop between the first end of the dim setting resistor $R_{SET}$ 208 and the adjust terminal ADJ of the adjustable regulator 202.

Figure 3:
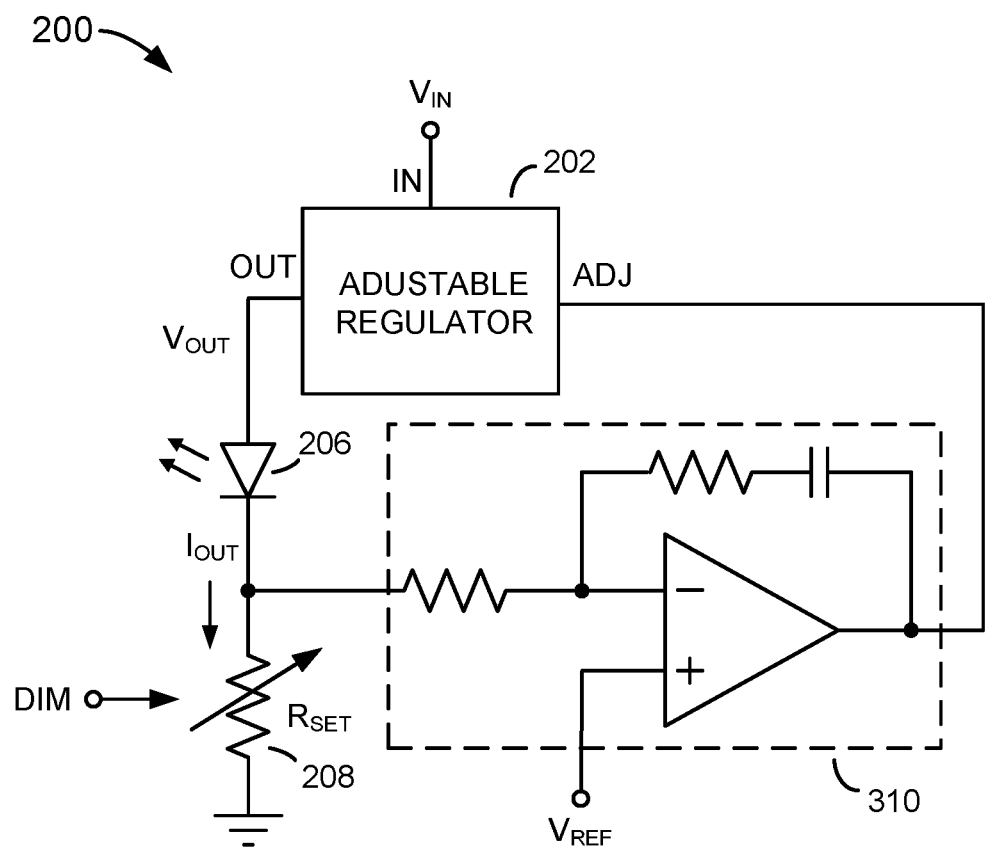
FIG. 3 is a schematic drawing illustrating how the sensor of the SSL system in FIG. 2 may be implemented using an operational amplifier, in accordance with an embodiment of the invention.

The current sensor 204 may be implemented in various ways. In one embodiment of the invention depicted in FIG. 3, for example, it is implemented using an operational amplifier (op-amp) circuit 310. During operation, the adjustable regulator 202 serves to increase or decrease its output voltage $V_{OUT}$ and the forward voltage drop across the LED 206, depending on the resistance setting of the dim setting resistor $R_{SET}$ 208 (as set by a dim control signal DIM). A change in the resistance setting of the dim setting resistor $R_{SET}$ 208 results in a change in the current $I_{OUT}$ flowing through it. The range of current flowing through the LED 206 therefore depends on the adjustable range of the dim setting resistor $R_{SET}$ 208. In one embodiment of the invention, for example, the dim setting resistor $R_{SET}$ 208 is adjustable over a range of about 0.5Ω to 10 kΩ. Due to the presence of the op-amp circuit 310, the voltage dropped across the dim setting resistor $R_{SET}$ 208 is forced to be maintained at substantially the same voltage as the reference voltage $V_{REF}$, regardless of the resistance setting of the dim setting resistor $R_{SET}$ 208. As the resistance of the dim setting resistor $R_{SET}$ 208 is adjusted higher (to increase dimming), the current $I_{OUT}$ flowing through the dim setting resistor $R_{SET}$ 208 decreases. The op-amp circuit 310 senses the decrease in current $I_{OUT}$ and causes the adjustable regulator 202 to lower its output voltage $V_{OUT}$ so that the forward voltage drop across the LED 206 tracks and corresponds to a current in the LED's I-V characteristics that matches the reduced current flowing through the dim resistor $R_{SET}$ 208. (The current flowing through the dim setting resistor $R_{SET}$ 208 must always match the current flowing through the LED 206 since the dim setting resistor $R_{SET}$ 208 and LED 206 are connected in series.) The reduced current flowing through the LED 206 results in a corresponding reduction in light emitted by the LED 206, thereby producing the desired dimming effect. Conversely, when the value of the dim setting resistor $R_{SET}$ 208 is adjusted lower to increase brightness (i.e., reduce dimming), the current $I_{OUT}$ increases and the adjustable regulator 202 increases its output voltage $V_{OUT}$ so that the forward voltage drop across the LED 206 and the current flowing it increase to match the current set by the dim setting resistor $R_{SET}$ 208. The increased current $I_{OUT}$ results in more light being emitted by the LED 206 and consequently an increase in brightness of the light emitted by the LED 206.

Figure 4:
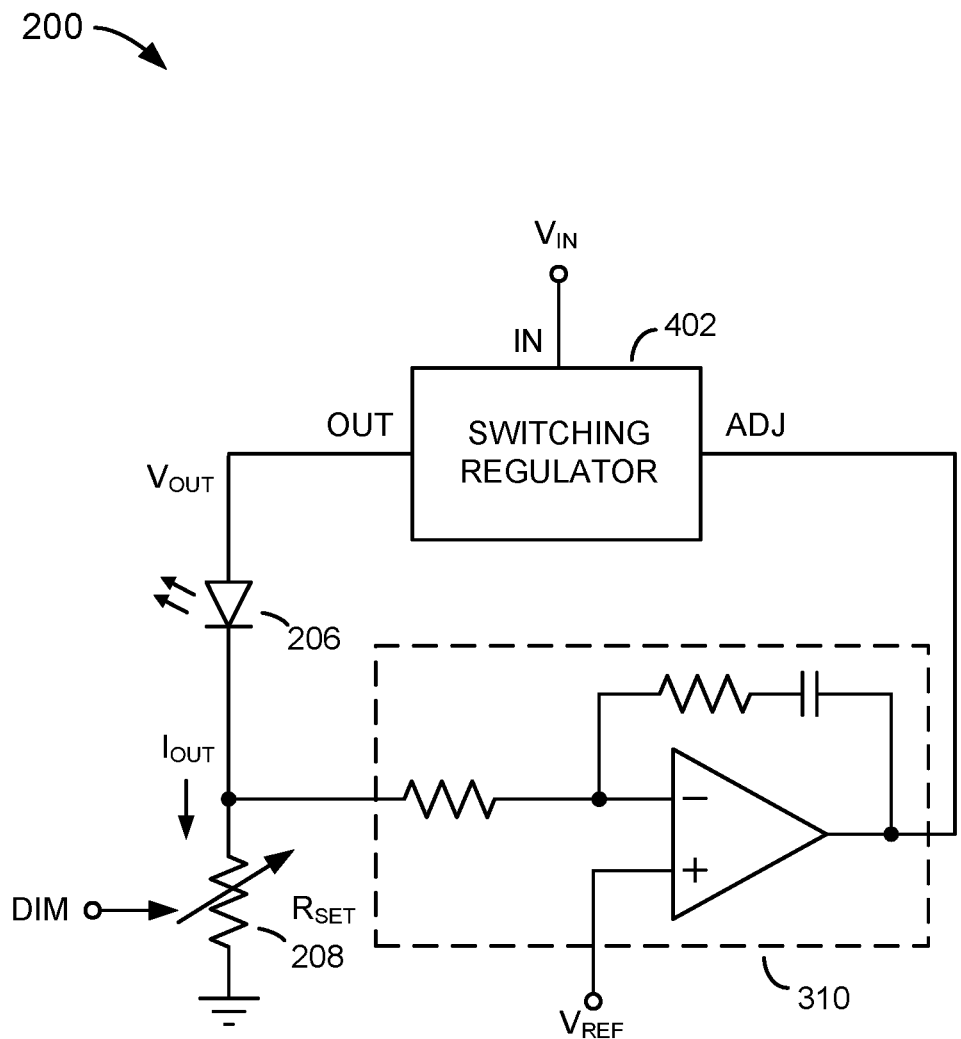
FIG. 4 is a schematic illustrating how the adjustable regulator of the SSL system in FIG. 2 may be implemented using a switching regulator, in accordance with an embodiment of the invention.
Figure 5:
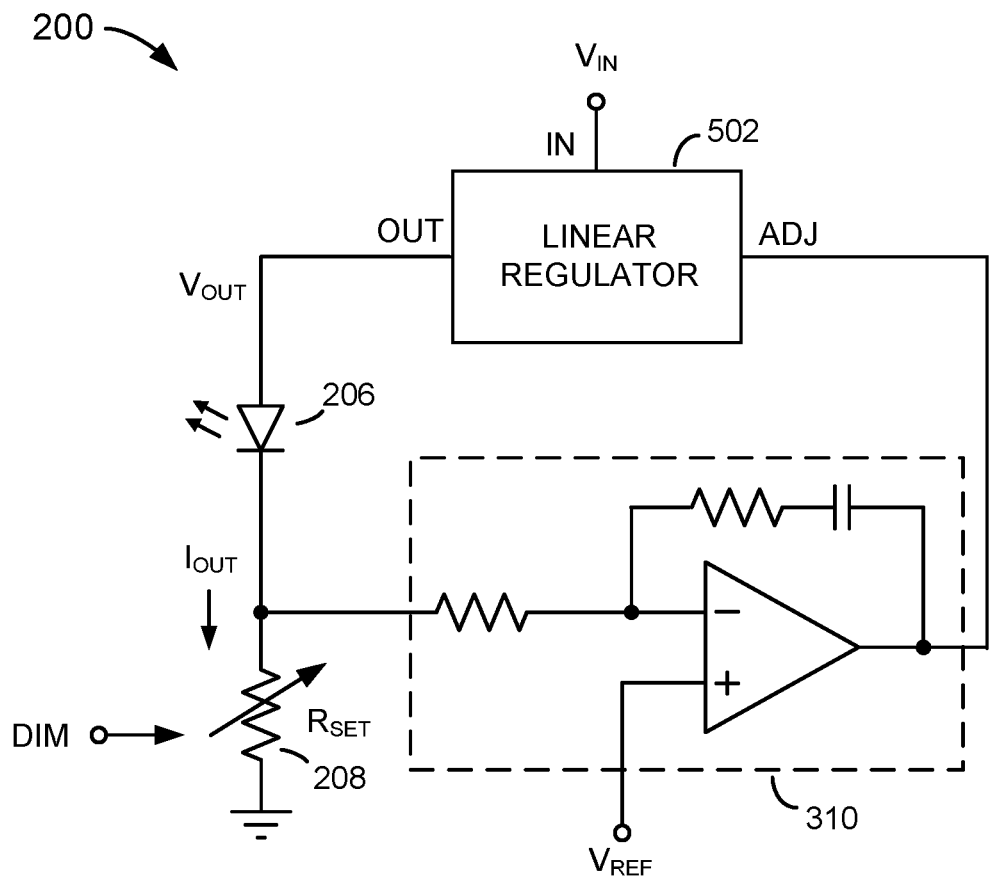
FIG. 5 is a schematic illustrating how the adjustable regulator of the SSL system in FIG. 2 may be implemented using a linear regulator, in accordance with an embodiment of the invention.

The adjustable regulator 202 can be implemented in various ways. It can be implemented using a switching converter 402, as illustrated in FIG. 4. Alternatively, it can be implemented using a linear regulator 502, as illustrated in FIG. 5.

The SSL systems disclosed herein are capable of achieving dimming over a wide dynamic range (up to 1000:1 or even greater). In various embodiments of the invention a dimming ratio exceeding 20,000:1 has even been realized. The resistance range required of the dim setting resistor $R_{SET}$ 208 is further easily realizable using standard integrated circuit (IC) manufacturing processes. As an example, using a reference voltage $V_{REF}$=100 mV and for a 1000:1 dimming range and an LED that conducts 350 mA at full brightness (typical of a high-brightness LED (HB-LED)) and 350 μA at maximum dimming, the minimum value $R_{SET}$(min) of the dim setting resistor $R_{SET}$ 208 would be 0.28 ohms (full brightness) and the maximum value $R_{SET}$(max) of the dim setting resistor $R_{SET}$ 208 would increase to 333 ohms (maximum dimming). This range of resistance values is well within the range of resistor values that can be manufactured using standard and readily available IC manufacturing processes.

Figure 6:
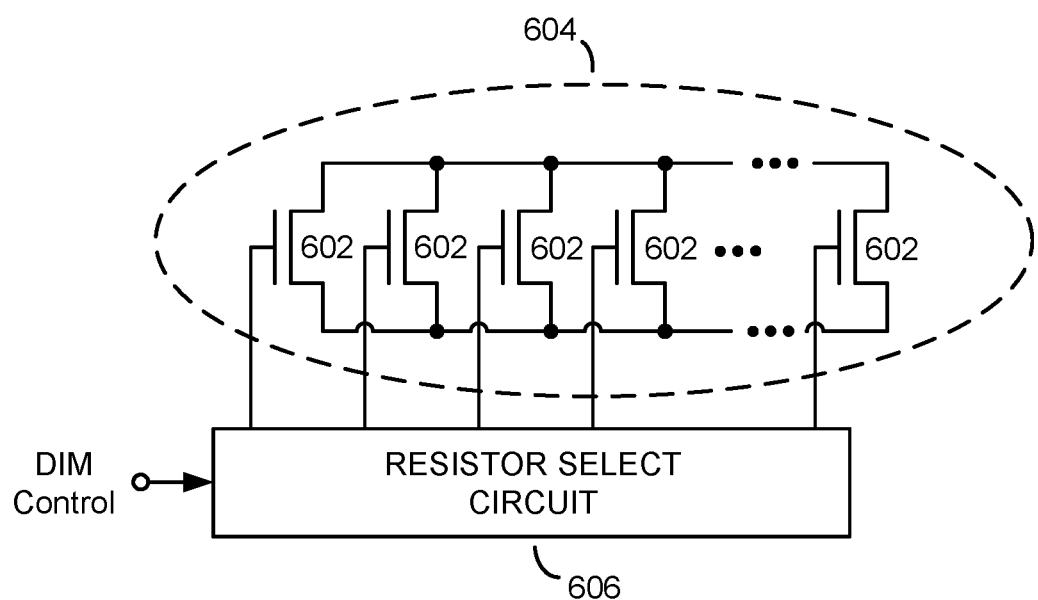
FIG. 6 is a schematic drawing illustrating how the variable dim setting resistor of the SSL system in FIG. 2 may be implemented using a resistor bank and resistor select circuit, in accordance with an embodiment of the invention.

In one embodiment of the invention the dim setting resistor $R_{SET}$ 208 is fabricated and implemented using a plurality of metal-oxide-semiconductor field-effect transistors (MOSFETs) 602 arranged in what may be referred to as a "resistor bank" 604, as illustrated in FIG. 6. The resistor bank 604 is controlled by a resistor select circuit 606. Depending on the DIM control setting applied to the resistor select circuit 606 and the value of the dim setting resistor $R_{SET}$ needed to achieve a certain dimming level, one or a plurality of the MOSFETs 602 in the resistor bank 604 is/are selected and biased in their triode region of operation so that they can serve as reliable, constant-valued resistors. When a plurality of MOSFETs 602 is selected, the MOSFETs 602 are configured in parallel and, therefore, a lower resistance for $R_{SET}$ is established. Conversely, when a fewer number of MOSFETs 602 is selected the resistance increases and a higher resistance for $R_{SET}$ is established. Low power dissipation in the dim setting resistor $R_{SET}$ 208 allows reliable and straightforward implementation. From the earlier example provided in paragraph [00020] above, the maximum power dissipation is only $(0.1^2/0.28)=36$ mW.

In the exemplary resistor bank 604 just described, it is assumed that each MOSFET 602 has the same resistance value and that a plurality of MOSFETs 602 is selected and configured in parallel to realize different values of $R_{SET}$. However, that need not be the case. For example, the resistor bank 604 can be alternatively designed to include a plurality of MOSFETs, each having a different resistance value (with different length-to-width L/W ratios) and/or the resistor bank 604 and resistor select circuit 602 can be configured such that only a single one of the different-sized MOSFETs/resistances is selected for each dim setting. It should also be mentioned that whereas MOSFETs 602 are used to implement the various resistors of the resistor bank 604, rather than using MOSFETs 602, the resistors of the resistor bank 604 can be alternatively implemented using any other suitable resistor manufacturing technique employed in IC fabrication processing.

Figure 7:
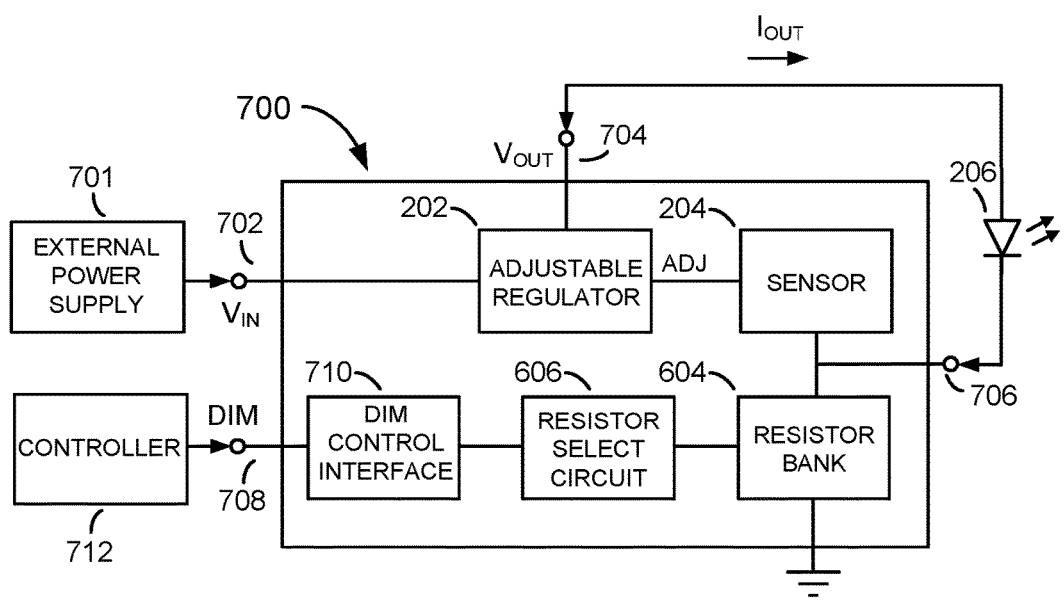
FIG. 7 is a block diagram of an integrated circuit implementation of an SSL system with dimming capability, in accordance with an embodiment of the invention.

The other components of the SSL system 200, including the adjustable regulator 202 and current sensor 204, may also be manufactured according to standard and readily available semiconductor manufacturing processes. In one embodiment of the invention illustrated in FIG. 7, all or most all of the components of the SSL system 200 are fabricated in a single IC 700. The IC 700 is assembled and packaged with an input power pin or terminal 702 for receiving the DC input voltage $V_{in}$ from an external power supply 701, pins or terminals 704 and 706 for connecting the LED 206 (or LED string), and an input pin or terminal 708 for receiving the dim control signal DIM. The IC 700 may also include a dim control interface 710 for interfacing with an external controller 712, which may be an analog or digital, depending on the design. For example, the dim control interface 710 may be a controller that responds to a device as simple as an analog switch or may be a more complex digital interface that is configured to respond to a digital signal, such as the digital output of an analog-to-digital converter, microcontroller or digital processor, for example.

In addition to being capable of dimming over a wide dynamic range and to very low light levels, the SSL systems of the present invention produce no flicker at any dim level. As explained above in the Background of the Invention, prior art SSL systems typically employ pulse-width modulation to perform dimming, which results in light flicker that is particularly perceptible at lower light levels. Flicker is not merely a slight nuisance. It is known to cause headaches, impaired visual performance, and diminished ocular motor control, and in some individuals it can even induce or increase the risk of epileptic seizures.

The SSL system of the present invention is also very energy efficient. For a maximum LED current of, for example, 350 mA (typical for an HB-LED), the dim-setting resistor maximally adds only 0.1×0.35=35 mW (assuming $V_{REF}$=100 mV) to the overall system power dissipation. Power dissipation can be further reduced by using a lower reference voltage $V_{REF}$. For example, for VREF=40 mV, the added power dissipation falls to only 14 mW.

Finally, only a very small control voltage overhead is needed to achieve dimming over a wide dynamic range. For instance, in the example provided above the control voltage overhead is only the small reference voltage $V_{REF}$ that appears across the dim-setting resistor $R_{SET}$ 208. Assuming $V_{REF}$=100 mV (a value of $V_{REF}$ in one embodiment of the invention), the control voltage overhead is less than 3% of the typical 3.5 V forward voltage drop of an HB-LED.

While various exemplary embodiments of the present invention have been illustrated and described in detail above, those of ordinary skill in the art will appreciate and understand that various changes in form and detail may be made without departing from the true spirit and scope of the invention. The scope of the invention should therefore not be restricted to the specifics of the exemplary embodiments described but instead determined by the words of the appended claims and the full scope of equivalents to which such claims are entitled.

What is claimed is:

1. A solid-state lighting (SSL) system, comprising:
  a string of one or more light-emitting devices;
  a variable dim-setting resistor connected in series with the string of one or more light-emitting devices, the variable dim-setting resistor having an externally adjustable variable resistance that is adjustable over a range of resistance settings and adjusted and controlled during operation to determine a magnitude of current flowing through the string of one or more light-emitting devices and, consequently, the brightness of light emitted by the string of one or more light-emitting devices;
  a voltage regulator configured to produce and apply a continuous regulated voltage across the series-connected variable dim-setting resistor and string of one or more light-emitting devices; and
  a feedback system coupled between the variable dim-setting resistor and an adjust input of the voltage regulator, the feedback system having an operational amplifier with an inverting input terminal configured to receive a voltage representative of the current flowing through the string of one or more light-emitting devices, a non-inverting input terminal configured to receive a fixed reference voltage that remains fixed for all resistance settings of the variable dim-setting resistor, and an output terminal coupled to a voltage adjust input input terminal of the voltage regulator,
  wherein neither the regulated voltage produced by the voltage regulator nor the current flowing through the string of one or more light-emitting devices is interrupted to effect dimming of the light emitted by the string of one or more light-emitting devices, and
  wherein the range of resistance settings over which the variable dim-setting resistor can be adjusted provides for a dimming dynamic range of 1000:1 or greater.

2. A method of controlling dimming in a solid-state lighting (SSL) system, comprising:
  directing a continuous and non-pulsed current through a string of one or more light-emitting devices and a variable and externally adjustable dim-setting resistor connected in series with the string of one or more light-emitting devices;
  reducing a magnitude of the continuous and non-pulsed current being directed through the series-connected string of one or more light-emitting devices and the variable and externally adjustable dim-setting resistor by increasing a resistance of the variable and externally adjustable dim-setting resistor, to dim light being emitted by the series-connected string of one or more light-emitting devices; and regulating a continuous voltage applied across the series-connected string of one or more light-emitting devices and the variable and externally adjustable dim-setting resistor, wherein regulating the voltage applied across the series-connected string of one or more light-emitting devices and the variable and externally adjustable dim-setting resistor includes continually forcing a voltage drop across the variable and externally adjustable dim-setting resistor to be maintained at a fixed reference voltage, independent of a resistance setting of the variable and externally adjustable dim-setting resistor, and the variable and externally adjustable dim-setting resistor has a range of resistance settings that allow the light being emitted by the series-connected one or more light-emitting devices to be controlled over a dimming dynamic range of 1000:1 or greater.

3. The method of claim 2, wherein regulating the continuous voltage applied across the series-connected string of one or more light-emitting devices and the variable and externally adjustable dim-setting resistor comprises:

applying a voltage representative of the magnitude of the continuous and non-pulsed current to an inverting input terminal of an operational amplifier;

applying the fixed reference voltage to a non-inverting input terminal of the operational amplifier; and applying an adjust voltage produced at an output terminal of the operational amplifier to an adjust voltage input of a voltage regulator that is configured to regulate the voltage applied across the series-connected string of one or more light-emitting devices and the variable and externally adjustable dim-setting resistor.

4. The SSL system of claim 1, wherein the fixed reference voltage received at the non-inverting input terminal of the operational amplifier in the feedback system is 40 millivolts or higher.

5. The SSL system of claim 1, wherein the fixed reference voltage at the non-inverting input terminal of the operational amplifier in the feedback system is 100 millivolts or less.

6. The method of claim 3, wherein the fixed reference voltage applied to the non-inverting input terminal of the operational amplifier is 40 millivolts or higher.

7. The method of claim 3, wherein the fixed reference voltage applied to the non-inverting input terminal of the operational amplifier is 100 millivolts or less.

* * * * *